Nov. 10, 1953 — B. C. WILCOX — 2,658,776
STRUCTURAL ROD JOINT
Filed March 14, 1950 — 2 Sheets-Sheet 1
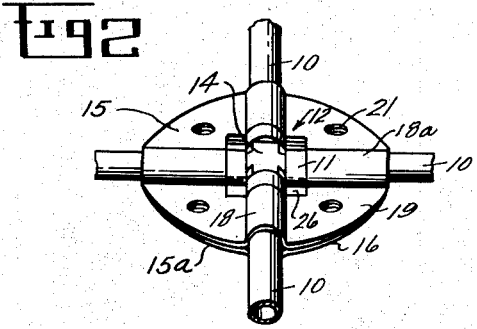
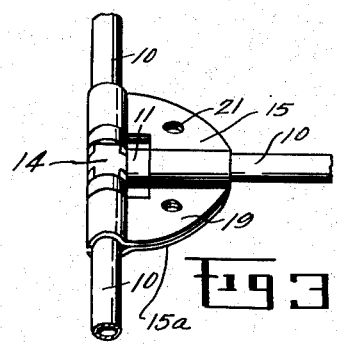
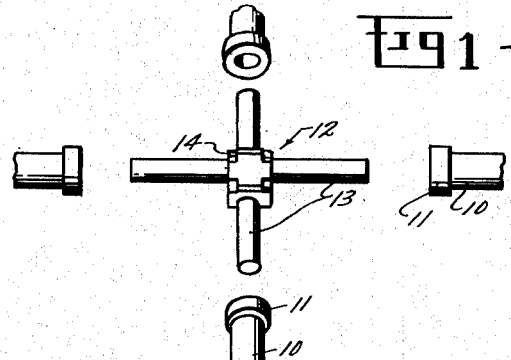
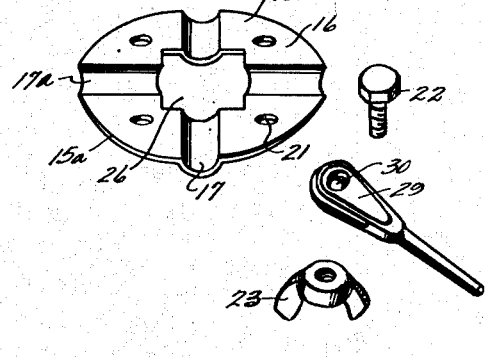
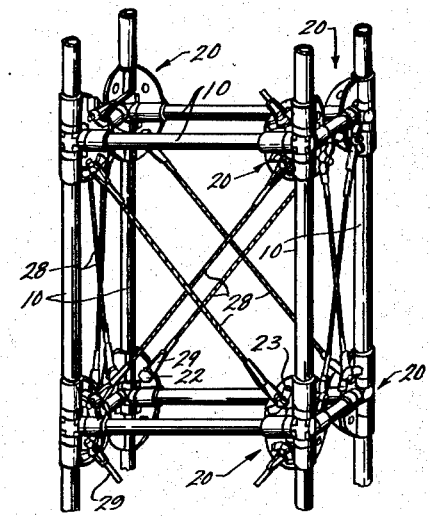
INVENTOR.
BURR C. WILCOX

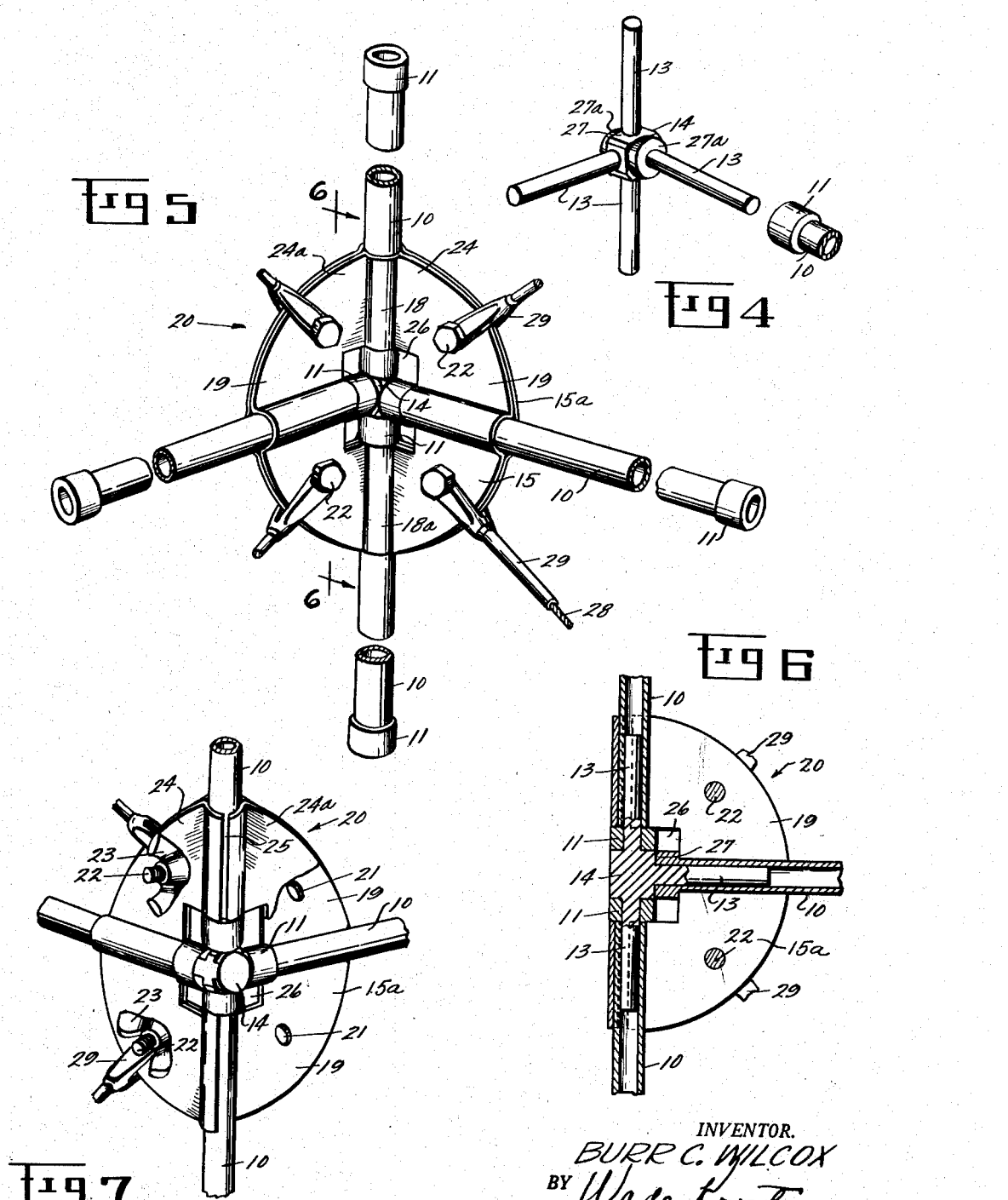

Patented Nov. 10, 1953

2,658,776

UNITED STATES PATENT OFFICE 2,658,776

STRUCTURAL ROD JOINT

Burr C. Wilcox, Dayton, Ohio

Application March 14, 1950, Serial No. 149,624

8 Claims. (Cl. 287—54)

(Granted under Title 35, U. S. Code (1952), sec. 266)

The invention described herein may be manufactured and used by or for the United States Government for governmental purposes without payment to me of any royalty thereon.

This invention relates to a structural assembly of tubular elements and a joint for assembling them in a firm manner, quickly and substantially without the use of tools. It is intended particularly for easy demountability and erectibility combined with compactness, so that it may be dropped from an airplane when rescue operations are attempted.

One object of the invention is to provide a demountable structural framework which will be useful in rescue operations to provide a shelter framework which can be dropped in demounted condition from an airplane.

Another object is to provide a framework of tubular members and a joint therefor which can be assembled in many different combinations and in each of them can be made strong and rigid.

Another object is to provide a structural framework in which long tubular elements or stringers are a major structural feature, since these can be made of light-weight piping, for example, of magnesium or Duralumin.

Briefly stated, the invention comprises a structural assembly of collared-end tubular stringers held together by clamping plates at the stringer junctions, these junctions being formed about a rod cluster which is the heart of the joint. The joint is intended to hold tubular members or stringers by their collared ends and they may extend in either one or two planes away from the joint. The joint may be made to accommodate either three or four tubular members. The clamping plates may be formed with bolt holes in their webbed portions, by which is meant the gusset portion of the plates between the various tubular members which they hold. The clamping plates are provided with holding means which extend through the bolt holes and if the holding means are bolts, they are preferably provided with wing nuts so that no tools will be needed to assemble the structure. Clevises having hollow ends may be transversely held by the bolts, which pass through the forks of the clevises in addition to extending transversely through the plates. The purpose of the clevises is to accommodate guy wires which may extend through the hollow ends of the clevises in a tensioned state to join two clevises of different joints into a strongly braced structure.

Referring now to the drawings:

Fig. 1 is an exploded perspective view of a joint of the one-plane type.

Fig. 2 is a perspective view of a one-plane, four-stringer joint of the kind shown exploded in Fig. 1 in an assembled condition.

Fig. 3 is a view corresponding to Fig. 2 but shows a three-stringer, one plane assembled joint.

Fig. 4 shows a cluster of four rods and one central knuckle in perspective. It also shows the collared end of one tubular stringer adapted to telescope over a rod.

Fig. 5 shows a completely assembled two plane joint retaining four tubular members or stringers in spaced angular relation. The stringers are shown broken intermediate their ends to indicate that their length may be indefinite. Fig. 5 shows the assembled joint concavely.

Fig. 6 is a cross section of the assembled joint shown in Fig. 5 taken on the lines 6—6 of that figure.

Fig. 7 is a convex perspective view of the same joint shown in Fig. 6 except that two clevises and their retaining nuts and bolts are omitted.

Fig. 8 shows an approximately cubical structure erected by the use of the new joints and stringers. In this figure, additional stringers are shown cross sectioned so as to indicate that the structure may extend further either upwardly or downwardly.

Referring again to Fig. 1, 10—10 are tubular members or stringers which are provided on at least one of their ends with a collar 11 which is preferably integral but which may be attached by screw threads or by spot welding. Four stringers 10 are shown in Fig. 1 in their relation to a cluster 12 of rods 13—13 which project each at right angles to the other from a substantially cubical knuckle 14. The stringers 10 should fit the rods 13 with an easy sliding fit and that the collars 11 are approximately equal in diameter to the size or faces of the knuckle 14 so that the ends 11 may snugly abut the knuckle. An upper clamping plate 15 and a lower clamping plate 15a are identical structures except that their positions are opposite each other so that their faces 16 may abut. Each clamping plate is channelled crosswise over its longest dimension by a hemispherical channel 17 and 17a. Appropriate bends 18 and 18a are evident at the outer surface of the plate. While the plates 15 or 15a are preferably circular, they are not limited to that shape. It is essential, however, whatever shape is employed, that the plates must have a gusset or web portion 19 between the channels or bends 17 or 18 and 17a or 18a. These gussets or webs 19 serve to hold the complete joint 20 together in cooperation with the channels 17—17a and bends 18—18a. The webs or gussets also are provided with bolt holes 21 through which extend holding means, preferably bolts 22, to which are operatively attached nuts 23, which are preferably wing nuts.

The plates 15 and 15a, when they are intended for two-plane joints, are made preferably, but not necessarily, in two pieces 24 and 24a. As will be noted from Fig. 7, there may be a space 25 between the two half-portions just mentioned. This divided construction is preferred when the joints and plates must necessarily be of large size. Otherwise the two-plane plates may be in one piece as shown in Fig. 5. Each plate, whether one-plane or two-plane, is provided with a central opening 26 which is preferably but not necessarily rectangular. The two-plane plates, when made in two pieces, have openings which, when the plates are placed in register, produce a combined opening similar to the one shown in Figs. 1, 2, 3 and 5. The purpose of the opening 26 is to provide a space for the accommodation of the knuckle 14 and the collars 11 when these are in closely abutting relation. In that case the edges of the opening 26 serve to hold the joint together by means of the rear edge of the collars 11. This construction makes for great rigidity and strength, as well as neat appearance, since the bends 18 or 18a are made of such as size as to have an outside diameter, when they are placed together, equal to that of the outside diameter of the collars 11.

The section shown in Fig. 6 makes the construction of the joint 20 clearly evident. The position of the rods 13 is shown to lie within the bores of the stringers 10 and the edges of the rectangular opening 26 are shown to support snugly the stringers 10 by their collars so that the outer ends of the stringers 10 and of their collars 11 are seen to be in close contact with a face 27 of the knuckle 14. The knuckle faces may be finished with a square configuration as shown at 27 in Fig. 4, or the faces may be rounded as shown at 27a in that figure. The rounded face is preferred, since then there is less of a gap between the outer end of the collar 11 and the face 27a of the knuckle 14.

One function of the gusset portion 19 is to provide a place for the attachment of means for attaching guy wires 28 to the joint 20. In Figs. 1, 5, 6, 7 and 8, the attaching means are clevises 29. These are provided with hollow shanks in the usual manner through which the guy wires at 28 may be attached in any conventional manner. The clevises 29 are drilled crosswise to provide openings 30 through which the bolts 22 are intended to extend when the clevises 29 are positioned over the edges of the pair of plates 15 and 15a at their webbed portions 19.

Referring now to Fig. 8, there is shown a generally cubical structure made from the combination of my joints and stringers. This structure is shown provided with eight joints 20 connected by eight stringers 10 to form the cubical part and eight other stringers extended above and below the cubical part to provide for additions to the structure in case they are needed or desired. If they are neither needed nor wanted, the joints 20 may, of course, be assembled without any of the upwardly or downwardly projecting stringers 10 shown cut off short in Fig. 8. In that case, of course, one of the stringer receiving channels of each plate 15 and 15a will be empty and the structure will rest upon the outer plate edges instead of on stringers. In Fig. 8 each face of the cubical part of the structure is shown braced by two diagonal guy wires 28. In practice these will be provided with turnbuckles for tightening. These elements are not shown because conventional. The structure shown in Fig. 8 may be used for supporting military instruments, for example, searchlights, radar apparatus, machine guns or if covered by a tarpaulin, could become a shelter for personnel.

From the foregoing, it will be evident to mechanically skilled persons that to assemble my structure, all that is necessary is to set the stringers in abutting relation to the cluster 12 and its knuckle 14 with the rods 13 inside the stringers then to clamp the plates 15 and 15a over the stringers and around the cluster attach the clevises 29, insert the bolts 22 through the holes 30 and 21 and then tighten the wing nuts 23. One joint is of course assembled after another; they are not all laid simultaneously.

I claim as my invention:

1. In a structural framework a plurality of tubular members, collars at the termini of said members, a fixed cluster of rods over which said tubular members fit, said cluster having a central knuckle, a pair of clamping plates having aligning grooves enclosing the tubular members and a central rectangular opening receiving the central knuckle and the collars of said tubular members when the latter abut said knuckle whereby to hold the assembly in that fixed angular relation which is determined by the rod cluster and prevent endwise displacement of said tubular members relative to said cluster of rods.

2. A structural framework comprising a plurality of tubular members, a rod cluster having a plurality of outwardly extending rods, each fitting telescopically one tubular member, said rod cluster having also a central knuckle from which the rods extend, a collar on the extremity of each tubular member, a pair of coinciding clamping-plates, each plate having at least two semicircular channels receiving a tubular member and having a central opening of generally rectangular shape receiving said knuckle and one collar of each tubular member telescopically attached to said rod cluster in abutting relationship with said knuckle whereby to retain the assembly together with a snug fit and a grip which is independent of frictional engagement.

3. In combination in a structural framework, a pair of substantially circular plates bent to substantially a right angle across a diameter thereof and grooved with semicircular channels at substantially right angles to each other, said plates having a relatively large substantially rectangular central opening and smaller aligned openings for the accommodation of bolts in the web portion of the plates between the channels, a rod cluster, the rods of which are enclosed between said channels, said rod cluster having a central knuckle of substantially cubical shape positioned in said relatively large opening, tubular members held between the channels of said plates telescopically engaging the respective rods, a collar on each of said tubular members, said collar filling the space existing between one face of the knuckle and the internal edge of said plates, and a bolt extending through each of said smaller aligned openings in said plates.

4. The combination set forth in claim 3 and in addition a tubular clevis extending over the web portion of the plates by its fork, said clevis having a transverse opening extending through the fork thereof, one of the respective bolts extending through both the clevis forks and through the plate web openings.

5. In combination in a structural framework, a plurality of tubular members having a collar on at least one end thereof, a plurality of pairs of angled plates each formed to snugly enclose and hold four end-collared tubular members substantially by their collared ends while leaving room for a joint at the junction, a rod cluster substantially enclosed within each of said pairs of plates, said tubular members fitting over the rods thereof, said rod cluster having a substantially cubical knuckle at the rod junction forming a joint, each of said collared ends abutting one face of said knuckle, clevises attached to the said plates at the gusset portions thereof and a tensioned guy wire attached to a clevis of a different joint at each end of said wire.

6. In combination in a structural framework, a pair of substantially matching semicircular plates, a pair of semicircular concave channels formed in each of said plates, one matching pair extending in line across the straight edge thereof and the other pair extending at a right angle thereto, said plates having a relatively large substantially rectangular opening where the channels would meet if prolonged, a rod cluster in said opening, the rods of which extend through said channels, a substantially cubical knuckle at the meeting point of the rods of said rod cluster and three tubular end-collared members enclosed by their ends between said plates with the exception of the collared portions, the ends of the collared portions each abutting one face of the cubical knuckle and being snugly retained against said knuckle faces by the edges of said rectangular plate openings.

7. A joint for a plurality of tubular members comprising collars on each tubular member at the joint end thereof, a knuckle member having a central head portion, cylindrical studs extending from the head portion and the head portion having an abutment face normal to each stud, each one of said tubular members each being positioned on a respective one of said studs with the tubing collar engaging the corresponding abutment face of the head portion of the knuckle member and a pair of clamping plates having complementary grooves engaging opposite sides of the respective tubular members, said clamping plates having gusset portions extending between the respective grooves and said plates being formed with a central aperture having edges each engaging and holding stationary the rear face of a respective collar and fastening means for retaining said clamping plates in assembled relation.

8. In a structural framework, an even number of rod clusters including rods extending in at least two planes from a central knuckle of substantial size, a tubular member slidably fitting over each rod of each cluster, said tubular members extending for a substantial length and having on each one of its ends a collar of a width substantially identical with the width of the central knuckles of the rod clusters, both said rod clusters and collared ends of said tubular members having abutting flat faces, pairs of substantially coinciding clamping plates, each pair having formed therein a matching pair of semi-cylindrical cavities each accommodating a tubular member, said plates being folded upon a line joining two of the opposite cavities to substantially a right angle, each plate being provided with an opening occupying two planes, the two portions of said opening combined being equal substantially to a square opening to which the semicircular cavities lie normal, the opening being of such a size that an assembly of one knuckle and four collared ends will fit closely therein, the edges of said openings substantially engaging the edges of the collars furthest from said knuckle, and means for holding said plates in coinciding relation against heavy stresses.

BURR C. WILCOX.

References Cited in the file of this patent

UNITED STATES PATENTS

| Number | Name | Date |
| --- | --- | --- |
| Re. 10,292 | Adams | Mar. 6, 1883 |
| Re. 16,996 | Speakman et al. | June 12, 1928 |
| 311,165 | Adams | Jan. 27, 1885 |
| 349,397 | Lantz | Sept. 21, 1886 |
| 509,458 | Still | Nov. 28, 1893 |
| 569,687 | Todd | Oct. 20, 1896 |
| 685,876 | Shields | Nov. 5, 1901 |
| 760,621 | Guy | May 24, 1904 |
| 1,075,281 | Anderson | Oct. 7, 1913 |
| 1,667,256 | Herrschaft | Apr. 24, 1928 |
| 1,817,775 | Sipe | Aug. 4, 1931 |
| 2,018,539 | Welsh | Oct. 22, 1935 |
| 2,460,622 | Crawley | Feb. 1, 1949 |
| 2,466,148 | Birr | Apr. 5, 1949 |

FOREIGN PATENTS

| Number | Country | Date |
| --- | --- | --- |
| 8,399 | Great Britain | of 1888 |
| 416,217 | Great Britain | Sept. 13, 1934 |
| 545,972 | Great Britain | of 1942 |
| 802,824 | France | Sept. 16, 1936 |